US008670564B1

(12) United States Patent
Clayton et al.

(10) Patent No.: US 8,670,564 B1
(45) Date of Patent: Mar. 11, 2014

(54) DATA ENCRYPTION SYSTEM AND METHOD

(75) Inventors: Ray Clayton, Madison, AL (US); Eliel J. Mendoza, Carnation, WA (US); Ronn Warren Cochran, Madison, AL (US)

(73) Assignee: Key Holdings, LLC, Huntsville, AL (US)

( * ) Notice: Subject to any disclaimer, the term of this patent is extended or adjusted under 35 U.S.C. 154(b) by 1664 days.

(21) Appl. No.: 11/838,652

(22) Filed: Aug. 14, 2007

Related U.S. Application Data

(60) Provisional application No. 60/837,478, filed on Aug. 14, 2006.

(51) Int. Cl.
H04L 29/06 (2006.01)

(52) U.S. Cl.
USPC .......................................................... 380/46

(58) Field of Classification Search
USPC .......................................................... 380/46
See application file for complete search history.

(56) References Cited

U.S. PATENT DOCUMENTS

| | | | |
|---|---|---|---|
| 4,200,770 A | | 4/1980 | Hellman et al. |
| 4,306,111 A | * | 12/1981 | Lu et al. ........................ 380/30 |
| 4,731,540 A | | 3/1988 | Schmidt |
| 4,797,920 A | | 1/1989 | Stein |
| 5,081,678 A | | 1/1992 | Kaufman et al. |
| 5,202,922 A | | 4/1993 | Iijima |
| 5,363,447 A | | 11/1994 | Rager et al. |
| 5,481,613 A | * | 1/1996 | Ford et al. ..................... 380/30 |
| 5,564,106 A | | 10/1996 | Puhl et al. |
| 5,586,186 A | | 12/1996 | Yuval et al. |
| 5,680,456 A | | 10/1997 | Baker et al. |
| 5,689,565 A | | 11/1997 | Spies et al. |
| 5,745,571 A | | 4/1998 | Zuk |
| 5,764,772 A | | 6/1998 | Kaufman et al. |
| 5,848,159 A | * | 12/1998 | Collins et al. .................... 380/30 |
| 5,850,443 A | | 12/1998 | Van Oorschot et al. |
| 5,878,136 A | | 3/1999 | Kim et al. |
| 5,933,503 A | | 8/1999 | Schell et al. |
| 5,995,623 A | | 11/1999 | Kawano et al. |
| 6,006,328 A | | 12/1999 | Drake |
| 6,009,174 A | | 12/1999 | Tatebayashi et al. |
| 6,049,878 A | | 4/2000 | Caronni et al. |
| 6,058,188 A | | 5/2000 | Chandersekaran et al. |
| 6,091,835 A | | 7/2000 | Smithies et al. |

(Continued)

FOREIGN PATENT DOCUMENTS

WO      WO/95/08232      3/1995
WO      WO 2007062688 A1 *    6/2007

OTHER PUBLICATIONS

Bruce Schneier, "Applied Cryptography, Second Edition: protocols, algorithms, and source code in C," John Wiley & Sons, Inc., pp. 528-529, 1996.

*Primary Examiner* — Vu Le
(74) *Attorney, Agent, or Firm* — David E. Mixon; Bradley Arant Boult Cummings LLP

(57) ABSTRACT

A sender apparatus encrypts data using a key. The apparatus then calculates various parameters based on the key and a shared secret between the sender apparatus and a recipient apparatus that is remote from the sender apparatus. The calculated parameters are transmitted to the recipient apparatus, which uses such parameters to calculate the key based on the shared secret. The recipient apparatus then decrypts the data using the calculated key, which does not need to be transmitted from the sender apparatus to the recipient apparatus.

14 Claims, 4 Drawing Sheets

(56) References Cited

U.S. PATENT DOCUMENTS

| | | |
|---|---|---|
| 6,134,660 A | 10/2000 | Boneh et al. |
| 6,185,316 B1 | 2/2001 | Buffam |
| 6,263,446 B1 | 7/2001 | Kausik et al. |
| 6,317,834 B1 | 11/2001 | Gennaro et al. |
| 6,336,186 B1 | 1/2002 | Dyksterhouse et al. |
| 6,398,245 B1 | 6/2002 | Gruse et al. |
| 6,411,715 B1 * | 6/2002 | Liskov et al. .................. 380/277 |
| 6,535,607 B1 * | 3/2003 | Chandersekaran et al. .. 380/286 |
| RE38,070 E | 4/2003 | Spies et al. |
| 6,577,734 B1 | 6/2003 | Etzel et al. |
| 6,625,734 B1 | 9/2003 | Marvit et al. |
| 6,662,299 B1 | 12/2003 | Price, III |
| 6,769,060 B1 * | 7/2004 | Dent et al. .................... 713/168 |
| 6,847,719 B1 | 1/2005 | Ballard |
| 6,850,252 B1 | 2/2005 | Hoffberg |
| 6,912,285 B2 | 6/2005 | Jevans |
| 6,928,551 B1 | 8/2005 | Lee et al. |
| 6,944,762 B1 | 9/2005 | Garrison |
| 6,978,372 B1 | 12/2005 | Jakobsson |
| 7,047,414 B2 | 5/2006 | Wheeler et al. |
| 7,111,173 B1 * | 9/2006 | Scheidt .......................... 713/186 |
| 7,113,594 B2 | 9/2006 | Boneh et al. |
| 7,203,834 B1 | 4/2007 | Benayoun et al. |
| 7,284,127 B2 | 10/2007 | Gehrmann |
| 7,333,616 B1 | 2/2008 | Brettle et al. |
| 7,337,322 B2 | 2/2008 | Gentry et al. |
| 7,499,552 B2 | 3/2009 | Wilt et al. |
| 7,519,184 B2 | 4/2009 | Kayashima et al. |
| 7,523,495 B2 | 4/2009 | Johnson |
| 7,796,760 B2 | 9/2010 | Brettle et al. |
| 7,929,692 B2 | 4/2011 | Kim et al. |
| 8,108,674 B2 | 1/2012 | Takeda |
| 8,345,871 B2 | 1/2013 | Balfanz et al. |
| 8,365,301 B2 | 1/2013 | Miller |
| 8,397,083 B1 | 3/2013 | Sussland et al. |
| 8,423,794 B2 | 4/2013 | Holtzman et al. |
| 2003/0061483 A1 | 3/2003 | Schell et al. |
| 2003/0221131 A1 * | 11/2003 | Mori et al. ..................... 713/202 |
| 2008/0240427 A1 * | 10/2008 | Naslund .......................... 380/44 |
| 2010/0049979 A1 | 2/2010 | Adams et al. |

* cited by examiner

DATA ENCRYPTION SYSTEM AND METHOD

CROSS REFERENCE TO RELATED APPLICATION

This application claims priority to U.S. Provisional Patent Application No. 60/837,478, entitled "Data Encryption System and Method," and filed on Aug. 14, 2006, which is incorporated herein by reference.

RELATED ART

Various types of data encryption systems exist for protecting data from unauthorized users. As an example, in data encryption standard (DES) encryption, a key is shared between a sender and a recipient. This key is referred to as a "shared secret" in that it is "shared" between the sender and recipient but is kept "secret" with respect to untrusted users. The sender uses the key to encrypt data before sending it to the recipient, and the recipient, upon receiving the encrypted data, uses the key to decrypt the encrypted data. If an unauthorized user, sometimes referred to as a "hacker," gains access to the encrypted data, it is very difficult for such a user to extract any useful information from the data without the key.

In pretty good privacy (PGP) encryption, data is similarly encrypted between a sender and a recipient. However, the sender and recipient each have a pair of keys, a private key and a public key. The public keys are exchanged between the sender and the recipient. These keys are "public" in the sense that they may be shared with untrusted users without compromising the security provided by the encryption. Each private key, however, is a "private secret." In this regard, a private key is a "secret" in that it is not shared with untrusted users, and it is "private" in that it is not shared between the sender and the recipient. Ideally, only the sender is aware of his private key, and only the recipient is aware of his private key.

When sending data via PGP encryption, the sender randomly generates a session key and uses this session key to encrypt the data. The sender then encrypts the session key using the recipient's public key and transmits the encrypted data and the encrypted session key to the recipient. The recipient then uses his public key to decrypt the session key so that the session key can be used to decrypt the data. Although the public keys may be shared and known by others, it is important for each user to keep his or her private key secret since a private key can be used to decrypt the session key and, therefore, to ultimately decrypt the encrypted data.

There are various other key sharing encryption schemes that can be used to protect data being communicated between a sender and a recipient. However, a vulnerability of many of these encryption schemes is that secret keys used for encrypting and/or decrypting data are typically stored on a computer by the sender and/or recipient. Thus, it is possible for a hacker to employ known hacking techniques to access the data stored on such a computer and to thereby discover a secret key. The hacker may then use the key to extract useful information from encrypted data. Indeed, in order to recover a message defined by encrypted data, it is often much easier for a hacker to recover the message by finding the key that is needed to decrypt the data than it is for the hacker to break the encryption scheme.

Due to the vulnerability associated with hackers gaining access to secret keys, users are often encouraged to periodically obtain new encryption keys so that at least future messages can be protected from a hacker that has discovered a previously used key. However, periodically obtaining new encryption keys can be burdensome. Further, although a new encryption key can prevent a hacker from extracting useful information from future messages, obtaining a new encryption key does little to protect data that has been previously compromised due to a hacker finding a previously used key. Preventing a hacker from finding secret keys in the first place is a much more preferable solution.

Indeed, improvements to data security products, such as firewalls, have been developed in an effort to prevent hackers from gaining access to sensitive data, such as secret keys, residing on user computers. However, hackers have shown an ability to develop new techniques to defeat improvements to these data security products and access information residing on user computers.

Moreover, better encryption techniques are generally desirable to enhance data security and reduce the likelihood that an unauthorized useful can extract useful information from encrypted messages.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

The present disclosure generally pertains to data encryption systems and methods. A system in accordance with one exemplary embodiment of the present disclosure includes encryption logic that may be used by a sender to encrypt data to be sent to a recipient. In particular, the encryption logic randomly generates various numbers, including a key that is used to encrypt the data according to any known encryption scheme, such as data encryption standard (DES), advanced encryption standard (AES), or pretty good privacy (PGP), for example. The encryption logic uses the key to encrypt data that is to be sent to the recipient.

Further, the encryption logic uses an equation, referred to herein as the "key equation," that defines a relationship between a plurality of parameters, including the key that is used to encrypt the data. At least one of the parameters is a shared secret between the sender and the recipient. Using the key and the shared secret, the encryption logic calculates a value for at least one of the parameters defined by the key equation.

The encryption logic transmits the encrypted data to the recipient. In addition to transmitting the encrypted data, the encryption logic also transmits a sufficient number of the calculated values to allow the recipient to calculate the key based on the key equation. However, to help prevent an unauthorized user from gaining access to the key, the encryption logic does not transmit the key to the recipient but rather destroys the key after it is used to encrypt the data and to calculate at least one of the values being sent to the recipient. Based on the key equation, the shared secret, and the values received from the sender, the recipient calculates the key and uses the calculated key to decrypt the data.

Thus, the recipient is able to calculate the key without the key being communicated to the recipient. Further, by destroying the key, it is extremely difficult for a hacker to discover the key. In this regard, the key can be destroyed by the sender once it has been used to encrypt the data and to define at least one of the transmitted values, as described above. Further, when the recipient wishes to decrypt the data, the recipient can calculate the key based on the shared secret and transmitted values, use the calculated key to decrypt the data, and then destroy the key. Thus, the key is available at the equipment of the sender or recipient only for a short time making it very difficult for a hacker to find the key by hacking into such equipment.

Figure 1:
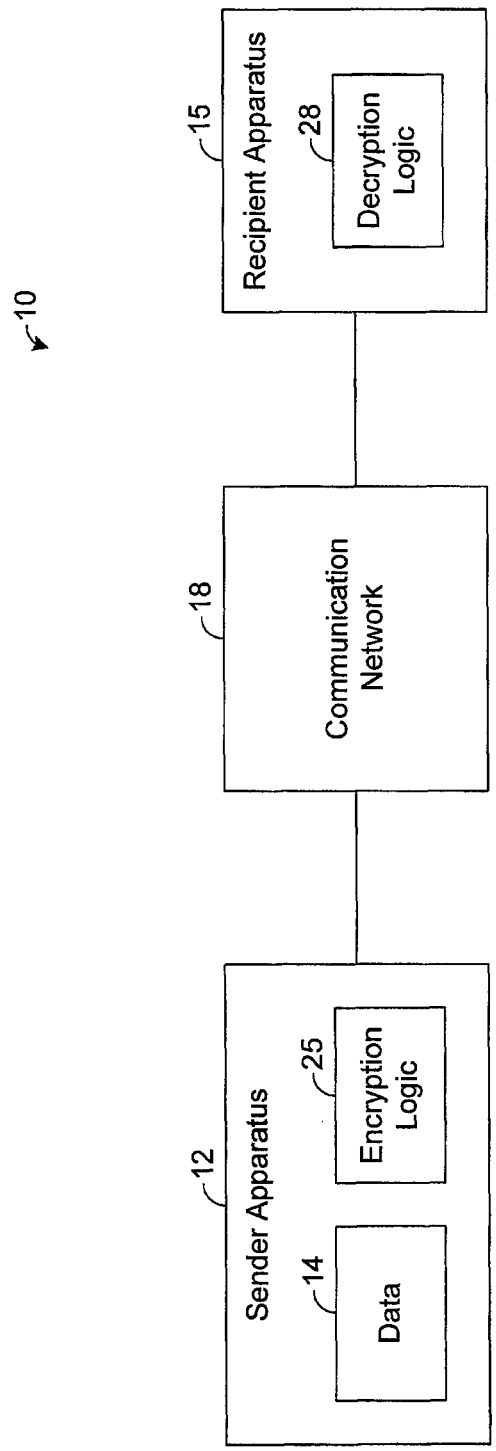
FIG. 1 is a block diagram illustrating an encryption system in accordance with an exemplary embodiment of the present disclosure.

FIG. 1 depicts a data encryption system 10 in accordance with an exemplary embodiment of the present disclosure. As shown by FIG. 1, the system 10 comprises a sender apparatus 12, such as a desk-top or lap-top computer or a personal digital assistant (PDA), for example, that is configured to transmit data 14 to a recipient apparatus 15, such as a desk-top or lap-top computer or a personal digital assistant (PDA), for example. In the example shown by FIG. 1, the sender apparatus 12 is coupled to and communicates with the recipient apparatus 15 via a communication network 18, such as the publicly switched telephone network (PSTN), a cellular network, and/or the Internet, for example. In one exemplary embodiment, the network 18 is a wide area network (WAN), but the other types of networks are possible in other embodiments. In addition, it is possible for the sender apparatus 12 to communicate with the recipient apparatus 15 directly (e.g., via wireless radio frequency (RF) signals) without the use of a network of any kind.

The sender apparatus 12 preferably comprises encryption logic 25 that encrypts the data 14 before sending it to the recipient apparatus 15, and the recipient apparatus 15 comprises decryption logic 28 that decrypts the data 14 after receiving it, in encrypted form, from the sender apparatus 12. Exemplary techniques for encrypting and decrypting the data 14 will be described in more detail hereafter. It should be noted that the encryption logic 25 and the decryption logic 28 can be implemented in software, hardware, or a combination thereof. In an exemplary embodiment illustrated in FIG. 2, the encryption logic 25 is implemented in software and stored in memory 32 of the sender apparatus 12. Further, in an exemplary embodiment illustrated in FIG. 3, the decryption logic 25 is implemented in software and stored in memory 35 of the recipient apparatus 15.

Note that the encryption logic 25 and the decryption logic 28, when implemented in software, can be stored and transported on any computer-readable medium for use by or in connection with an instruction execution device that can fetch and execute instructions. In the context of this document, a "computer-readable medium" can be any means that can contain, store, communicate, propagate, or transport a program for use by or in connection with the instruction execution device. The computer readable-medium can be, for example but not limited to, an electronic, magnetic, optical, electromagnetic, infrared, or semiconductor device or propagation medium.

Figure 2:
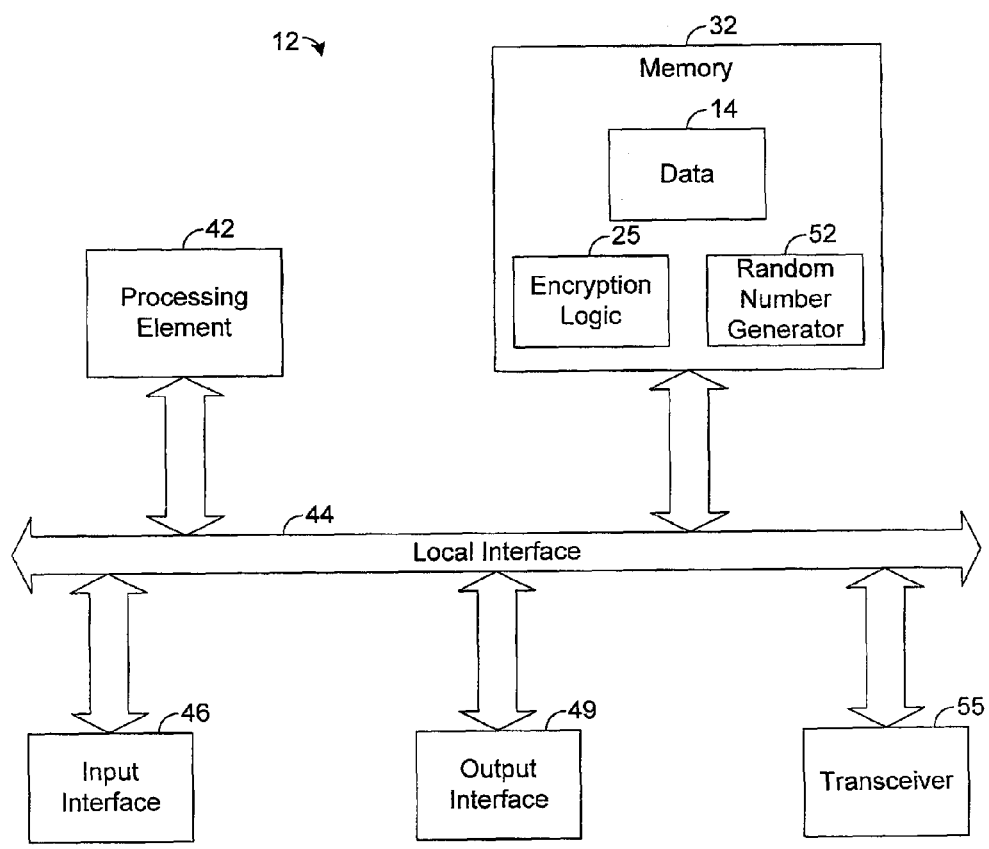
FIG. 2 is a block diagram illustrating a sender apparatus, such as is depicted in FIG. 1.

The exemplary embodiment of the sender apparatus 12 depicted by FIG. 2 comprises at least one conventional processing element 42, such as a digital signal processor (DSP) or a central processing unit (CPU), that communicates to and drives the other elements within the apparatus 12 via a local interface 44, which can include at least one bus. Furthermore, an input interface 46, for example, a keyboard or a mouse, can be used to input data from a user of the apparatus 12, and an output interface 49, for example, a printer or display device (e.g., a liquid crystal display or LCD), can be used to output data to the user. The sender apparatus 12 also comprises a random number generator 52 and a transceiver 55. The random number generator 52 is shown as being implemented in software, but the random number generator 52 may be implemented in hardware or a combination of software and hardware in other examples.

Figure 3:
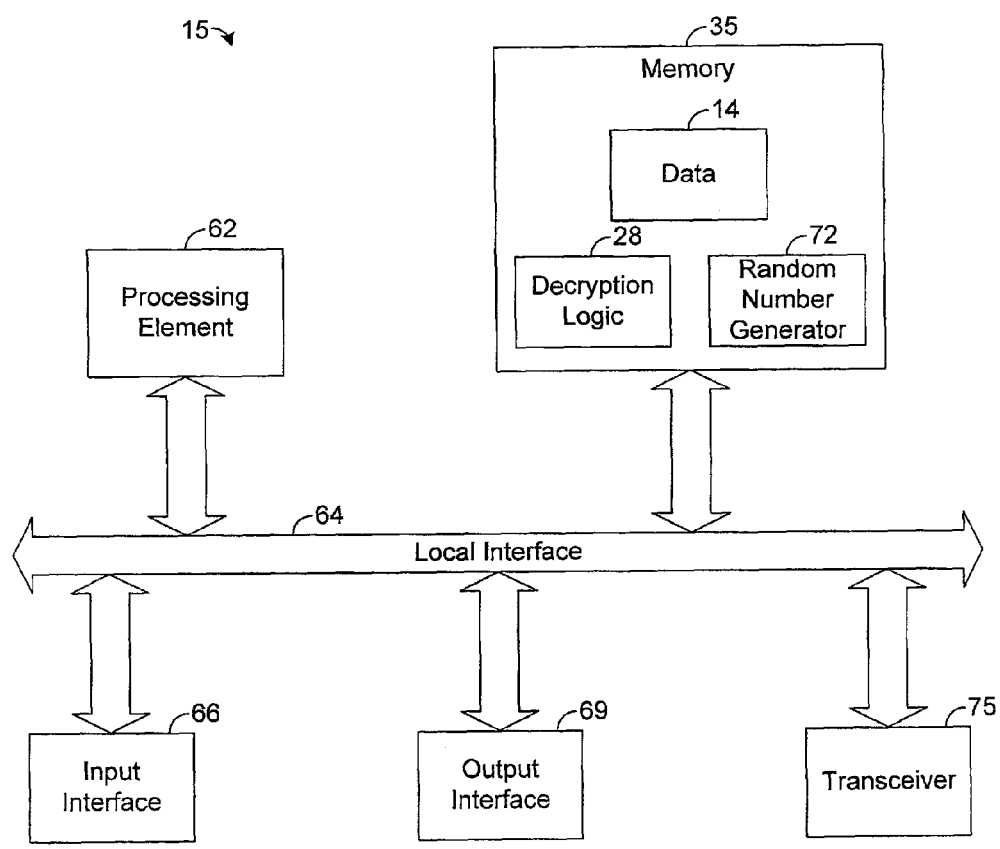
FIG. 3 is a block diagram illustrating a recipient apparatus, such as is depicted in FIG. 1.

The exemplary embodiment of the recipient apparatus 15 depicted by FIG. 3, like the sender apparatus 12, comprises at least one conventional processing element 62, such as a digital signal processor (DSP) or a central processing unit (CPU), that communicates to and drives the other elements within the apparatus 15 via a local interface 64, which can include at least one bus. Furthermore, an input interface 66, for example, a keyboard or a mouse, can be used to input data from a user of the apparatus 15, and an output interface 69, for example, a printer or display device (e.g., a liquid crystal display or LCD), can be used to output data to the user. The recipient apparatus 15 also comprises a random number generator 72 and a transceiver 75. The random number generator 72 is shown as being implemented in software, but the random number generator 72 may be implemented in hardware or a combination of software and hardware in other examples.

Initially, a set of prime numbers, referred to herein as "base numbers," is generated and shared between the sender apparatus 12 and the recipient apparatus 15. The base numbers may be generated or otherwise obtained by either apparatus 12 or 15, For illustrative purposes, assume that the base numbers are randomly generated by the random number generator 52 of the sender apparatus 12 and are transmitted to the recipient apparatus 15. As an example, the base numbers may be included in an email message and transmitted via transceiver 55 over the network 18 and received by the transceiver 75.

In one exemplary embodiment, three base numbers, P, G, and C, are randomly generated, and each of these numbers is 256 bits in length. However, other numbers of the base numbers and other bit lengths are possible in other embodiments.

The encryption logic 25 receives another randomly generated prime number, $P_s$, from the random number generator 52 and treats $P_s$ as a private secret. Thus, the encryption logic 25 does not share $P_s$ with the recipient apparatus 15. In one exemplary embodiment, the private number, $P_s$, like each of the base numbers, is 256 bits in length, but other bit lengths are possible in other embodiments. The encryption logic 25 combines the private number $P_s$ with the base numbers P and G to generate another number $Pub_s$, which is treated as a public number. In one embodiment, the foregoing numbers are combined according to the Diffie-Hellman equation. For example, $Pub_s$ may be calculated according to the equation, $Pub_s = G^{P_s} \mod P$. $Pub_s$ is preferably transmitted by the encryption logic 25, along with the base numbers, to the recipient apparatus 15. The decryption logic 28 stores the transmitted base numbers, P, G, and C, as well as $Pub_s$ in memory 35.

In addition, the decryption logic 28 receives a randomly generated prime number, $P_r$, from the random number generator 72 and treats $P_r$ as a private secret. Thus, the decryption logic 28 does not share $P_r$ with the sender apparatus 12. In one exemplary embodiment, the private number, $P_r$, like each of the base numbers, is 256 bits in length, but other bit lengths are possible in other embodiments. The decryption logic 28 combines the private number $P_r$ with the base numbers P and G to generate another number $Pub_r$, which is treated as a public number. In one embodiment, the foregoing numbers are combined according to the Diffie-Hellman equation. For example, $Pub_r$ may be calculated according to the equation, $Pub_r = G^{Pr} \bmod P$. $Pub_r$ is preferably transmitted by the decryption logic 28 to the sender apparatus 12. The encryption logic 25 stores $Pub_r$ in memory 32.

The encryption logic 25 receives three additional random numbers, K, M, and R, from the random number generator 52. In one exemplary embodiment, each of these numbers is 256 bits, although other bit lengths are possible. In the exemplary embodiment being described herein, K is a random prime number. M is not necessarily a prime number or larger than K, but M is preferably the same number of bits as K. R is a random prime number that preferably has a value larger than both the value of K and the value of M.

The encryption logic 25 uses K as a key to encrypt the data 14 according to any desired encryption scheme, such as PGP, DES, or AES, for example. However, to protect the key, K, that is used to encrypt the data 14, the encryption logic 25 does not share K with any other entity, even the decryption logic 28. Instead, the encryption logic 25 provides the decryption logic 28 with sufficient parameters to enable the logic 28 to calculate K according to a predefined algorithm, as will be described in more detail hereafter.

In this regard, the encryption logic 25 utilizes a predefined equation, also known by the decryption logic 28, to generate the parameters that are provided to the decryption logic 28 for enabling this logic 28 to calculate the key, K. In the instant example, the encryption logic 25 uses the following equation, referred to herein as the "key equation."

$$y = Mx + K \qquad \text{Equation (1)}$$

Both K and M are known by the encryption logic 25 but not the decryption logic 28. Note that other equations may be used as the key equation in other embodiments.

In the instant example, the encryption logic 25 is configured to use K to calculate values for at least one of the parameters in the key equation and to provide the calculated parameter to the decryption logic 28 to enable this logic 28 to calculate K based on the key equation, which is known by the logic 28. As described hereinabove, K is not communicated to the recipient apparatus 15 in order to keep K from being transmitted in the clear. In addition, in the instant example, another parameter, M, of the key equation is not transmitted to the recipient apparatus 15 to help obfuscate the key equation from any hacker who may be intercepting the values being transmitted to the recipient apparatus 15. Moreover, using M, K, and substituting a shared value for x in the key equation, the encryption logic 25 calculates y and transmits y to the recipient apparatus 15. In the instant example, the shared value substituted for x is C, which is one of the base numbers shared with the recipient apparatus 15, as described above. Thus, the calculated y value, which will be referred to hereafter as "$y_1$" can be expressed as follows.

$$y_1 = MC + K \qquad \text{Equation (2)}$$

However, since there are two unknowns (M and K) in the key equation for the decryption logic 28, the logic 28 does not yet have sufficient information for calculating K. Thus, the encryption logic 25 calculates y for another instance of x, and provides this newly calculated y value to the recipient apparatus 15. To obfuscate the algorithm that is used to calculate K, the value selected for x in this calculation is preferably a shared secret, S, which will be described in more detail hereafter. Thus, the encryption logic 25 substitutes S for x in the key equation and calculates y. The logic 25 then transmits y to the recipient apparatus 15. This calculated y value, which will be referred to hereafter as "$y_2$" can be expressed as follows.

$$y_2 = MS + K \qquad \text{Equation (3)}$$

Assuming that the shared secret, S, is known by the decryption logic 28, the decryption logic 28 now has sufficient information for calculating K. In this regard, in Equations 2 and 3, the decryption logic 28 is aware of all of the parameters except for M and K. Since there are two equations and two unknowns (M and K), the decryption logic 28 can solve the two equations for M and K. The decryption logic 28 may then use K as the key to decrypt the encrypted data 14 received from the sender apparatus 12.

To help obfuscate the encryption scheme, the shared secret is preferably based on private numbers that are not communicated between the sender apparatus 12 and the recipient apparatus 15. In the instant example, the private numbers used to calculate the shared secret S are $P_s$ and $P_r$. In this regard, the encryption logic 25 calculates S according to the following equation:

$$S = \text{hash}[(Pub_r^{Ps} \bmod P) + R] \qquad \text{Equation (4)}$$

where "hash" refers to a hashing function that is applied to the value within the brackets [ ]. Thus, the shared secret S is equal to the result of a hashing function that is performed on $Pub_r$ raised to the power of $P_s$ multiplied by the modulo of P plus R. As described above, $Pub_r$, $P_s$, P, and R are all known by the encryption logic 25. In one exemplary embodiment, the hashing function "hash" is a Shaw 256 hashing function, although other hashing algorithms may be used in other embodiments. Note that the value $Pub_r$ raised to the power of $P_s$ times the modulo of P refers to the Diffie-Hellman number for $Pub_r$, $P_s$, and P, treating $P_s$ as a private secret. Concatenating R, as well as taking a hashing function of the expression, helps to obfuscate the relationship between $Pub_r$, $P_s$, and P, and the hash function also reduces the bit length of S helping to facilitate the calculations set forth herein. Moreover, according to Diffie-Hellman principles, the following expression is true.

$$Pub_r^{Ps} \bmod P = P_r^{Pubs} \bmod P \qquad \text{Equation (5)}$$

Thus, the decryption logic 28, without being provided $P_s$, can calculate the shared secret S according to the following equation:

$$S = \text{hash}[(P_r^{Pubs} \bmod P) + R] \qquad \text{Equation (6)}$$

where "hash" refers to a hashing function that is applied to the value within the brackets [ ]. Thus, the shared secret S is equal to the result of a hashing function that is performed on $P_r$ raised to the power of $Pub_s$ multiplied by the modulo of P plus R. The hashing function is preferably the same one applied by the encryption logic 25 in calculating S, as described above. Further, the encryption logic 25 preferably shares R with the decryption logic 28 by transmitting R to the recipient apparatus 15. Knowing $y_1$, $y_2$, R, and S, the decryption logic 28 can calculate M and K and then use K to decrypt the data 14. Therefore, based on the values exchanged between the recipient apparatus 15 and the sender apparatus 12, as well as the shared secret S, which is calculable by both the encryption logic 25 and decryption logic 28, the decryption logic 28 is able to calculate the key, K, without K being communicated from the sender apparatus 12 to the recipient apparatus 15. Further, in calculating the shared secret, S, both the encryption logic 25 and the decryption logic 28 use a private number thereby enhancing the security of the encryption scheme.

In addition, after encrypting the data 14 with the key K and calculating $y_1$ and $y_2$, the encryption logic 25 preferably deletes K. In such a case, the key, K, would no longer exist until the decryption logic 28 later calculated it for decrypting the data 14. Accordingly, during this time, a hacker could not find the key by simply hacking into either the sender apparatus 12 or the recipient apparatus 15 and locating the key. The hacker could feasibly discover various numbers, such as $y_1$, $y_2$, and R, that are used to calculate the key. However, to use these numbers to decrypt the data 14 without finding the key, K, the hacker would first need to determine how the system 10, uses such numbers to calculate K or, in other words, break the scheme that is use to protect the key. Accordingly, the encryption techniques described herein address and protect against the vulnerability of a hacker attempting to locate a key that could be used to decrypt data. Indeed, once the decryption logic 28 decrypts the data 14, the logic 28 can similarly delete the key, K. Thus, the key, K, could be in existence only for a very short duration at either apparatus 12 or 15, making it extremely difficult for a hacker to find the key.

It should be noted that the above-described encryption techniques may be used to encrypt each message communicated between the sender apparatus 12 and the recipient apparatus 15. If desired, the base numbers, P, G, and C, may be communicated once. Thereafter, new values of K, M, and R, may be generated for each message or alternatively may be periodically updated. Many variations of the techniques described herein would be readily apparent to one of ordinary skill in the art upon reading this disclosure.

As described above, different types of equations may be used for the key equation. Further, different types of equations may produce different numbers of unknowns for the decryption logic 28. In this regard, in the exemplary embodiment described above, the key equation included two unknowns (M and K) for the decryption logic 28, and at least two instances of the key equation are, therefore, evaluated in order to provide the logic 28 with sufficient information for calculating K. In other examples, the key equation may have other numbers of unknowns for the logic 28. In such examples, other numbers of instances of the key equation may need to be evaluated in order to provide the logic 28 with sufficient information for calculating K.

An exemplary use and operation of the encryption system 10 will be described below with reference to FIG. 4.

Figure 4:
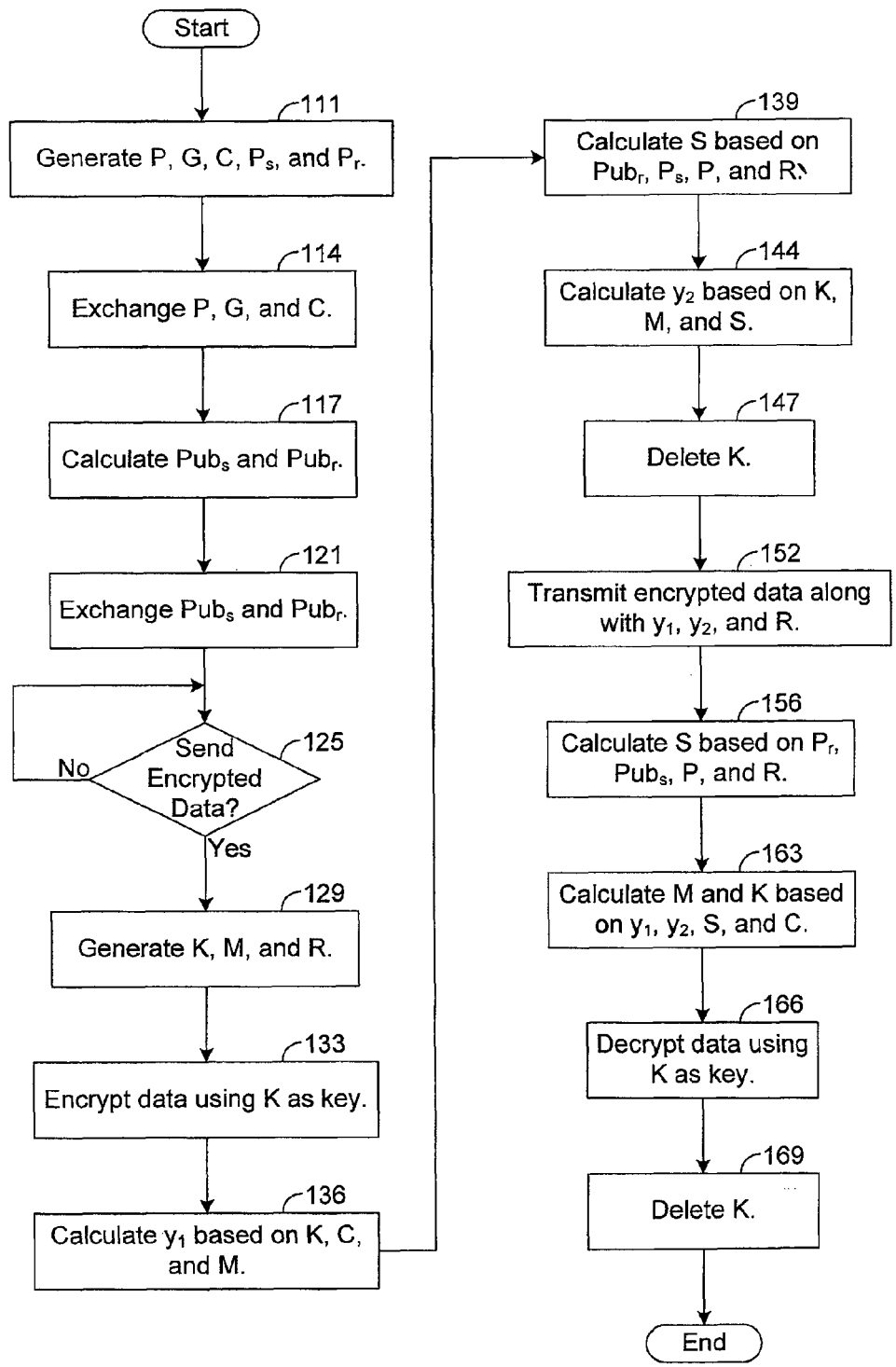
FIG. 4 is a flow chart illustrating an exemplary methodology for encrypting data in accordance with an exemplary embodiment of the present disclosure.

Initially, the values of P, G, C, $P_s$, and $P_r$ are randomly generated, as indicated by block 111 of FIG. 4. In this regard, the encryption logic 25 requests four randomly generated numbers from the random number generator 52, which provides the logic 25 with the base numbers, P, G, and C, as well as the sender's private number $P_s$, which is private to the encryption logic 25. In addition, the decryption logic 28 requests a randomly generated number from the random number generator 72, which provides the logic 28 with $P_r$, which is private to the decryption logic 28. As indicated by block 114, the base numbers, P, G, and C, are exchanged. In this regard, the encryption logic 25 transmits P, G, and C to the recipient apparatus 15, and the decryption logic 28 stores P, G, and C in memory 35.

In addition, the public numbers $Pub_s$ and $Pub_r$ are calculated based on P and G, as indicated by block 117. In this regard, the encryption logic 25 combines $P_s$, P, and G to generate $Pub_s$, and the decryption logic 28 combines $P_r$, P, and G to generate $Pub_r$. $Pub_s$ and $Pub_r$ are exchanged; as indicated by block 121. In this regard, the encryption logic 25 transmits $Pub_s$ to the recipient apparatus 15, and the decryption logic 28 stores $Pub_s$ in memory 35. In addition, the decryption logic 28 transmits $Pub_r$ to the sender apparatus 12, and the encryption logic 25 stores $Pub_r$ in memory 32. Thus, at this point, the encryption logic 25 and the decryption logic 28 are both aware of P, G, C, $Pub_s$, and $Pub_r$. Further, $P_s$ is a private number known only by the encryption logic 25, and $P_r$ is a private number known only by the decryption logic 28.

In block 125, the encryption logic 25 determines whether encrypted data is to be transmitted to the recipient apparatus 15. As an example, a user of the apparatus 12 may submit an input requesting that an email message, or other type of message, to be encrypted and sent to the recipient apparatus 15. In response, the logic 25 makes a "yes" determination in block 125.

As indicated by block 129, K, M, and R are generated. In this regard, the encryption logic 25 requests three randomly generated numbers from the random number generator 52, which provides the logic 25 with K, M, and R. The encryption logic 25 uses K as a key to encrypt the data 14 that is being transmitted to the recipient apparatus 15, as indicated by block 133. In addition, the encryption logic 25 calculates $y_1$ based on Equation 2 and the known values of K, C, and M, as indicated by block 136. The encryption logic 25 also calculates the shared secret, S, based on Equation 4 and the known values of $Pub_r$, $P_s$, P, and R, as indicated by block 139. The encryption logic 25 further calculates $y_2$ based on Equation 3 and the known values of K, M, and S, as indicated by block 144. After encrypting the data 14 with K and using K to calculate $y_1$ and $y_2$, the encryption logic 25 deletes K, as indicated by block 147. Thus, at this point, K no longer exists within the system 10.

As indicated by block 152, the encryption logic 25 transmits the encrypted data 14, as well as $y_1$, $y_2$, and R, to the recipient apparatus 15. As an example, if the encrypted data 14 defines a textual portion of an email message, the values of $y_1$, $y_2$, and R may be attached to the same email message that includes the encrypted data 14.

After the apparatus 15 receives the encrypted data 14, as well as $y_1$, $y_2$, and R, the decryption logic 28 calculates the shared secret, S, based on Equation 6 and the known values of $P_r$, $Pub_s$, P, and R, as indicated by block 156. Then, the decryption logic 28 calculates M and K based on Equations 2 and 3 and the known values of $y_1$, $y_2$, S, and C, as indicated by block 163. Having now calculated the key, K, the decryption logic 28 decrypts the data 14, as indicated by block 166. At this point, K is no longer needed, and the logic 28 deletes K, as indicated by block 169. Note that if another message is to be communicated between the sender apparatus 12 and the recipient apparatus 15, the same method shown by FIG. 4 may be used to transmit the message in either direction. However, if the same values of P, G, C, $P_s$, $P_r$, $Pub_s$, and $Pub_r$ are to be used, then the process may begin, at block 129 for future messages.

Moreover, as can be seen by the foregoing example, the key that it is used to encrypt the data 14 may be deleted shortly after encryption. Further, prior to deleting the key, the sender apparatus 12 may then calculate various numbers based on the key equation and then provide these numbers to the recipient apparatus 15, which may use the numbers to calculate the key. Thus, it is unnecessary for the key to be stored in either apparatus 12 or 15 except during the short duration that the key is actually being used (1) by the logic 25 to encrypt the data 14 or calculate the numbers from the key equation or (2) by the logic 28 to decrypt the data 14. Accordingly, even if a hacker hacks into and gains access to either apparatus 12 or 15, it is unlikely that the hacker would be able to find the key, K.

Now, therefore, the following is claimed:

1. A sender apparatus, comprising:
a processing element;
a transceiver; and memory for storing data, a first prime number (P), a second prime number (G), a third prime number (C), a first private prime number (Ps), a first random number (M), a second random number (R), wherein the first private prime number (Ps), the first prime number (P), and the second prime number (G) are used by the processing element to calculate a sender public number (PUB s) according to an equation $PUB_s = G^{Ps} \bmod P$, wherein the sender public number (PUBs) is provided to a recipient apparatus having knowledge of the first prime number (P), the second prime number (G), and the third prime number (C), wherein the processing element uses encryption logic and a randomly generated key to encrypt the data, wherein the processing element deletes the randomly generated key after encryption of the data, wherein the processing element uses the first prime number (P), the first private prime number (Ps), a recipient public number (PUBr), and the second random number (R) to calculate a common shared secret (S), wherein the processing element uses a key equation based on the key and the first random number (M) to calculate a plurality of parameters using simultaneous equations, wherein the third prime number (C) is used in the key equation to calculate a first one (Y1) of the plurality of parameters and the common shared secret (S) is used in the key equation to calculate a second one (Y2) of the plurality of parameters, wherein the encrypted data, the second random number (R), and the plurality of parameters (Y1,Y2) is transmitted by the transceiver to the recipient apparatus, the recipient apparatus using the first prime number (P), a recipient private prime number (Pr), the sender public number (PUBs), and the second random number (R) to calculate the common shared secret in accordance with a second shared secret equation and to use the common shared secret, the third prime number (C), the plurality of parameters (Y1,Y2) and the simultaneous equations to calculate the key without the key being transmitted to the recipient apparatus.

2. The sender apparatus of claim 1, wherein the sender public number (PUBs) is equal to a dividend modulo a divisor, wherein the dividend is the second prime number (G) raised to the power of the first private prime number (Ps) and the divisor is the first prime number (P).

3. The sender apparatus of claim 1, wherein the first one of the plurality of parameters (Y1) is equal to the key plus the second random number (M) multiplied by the third prime number (C).

4. The sender apparatus of claim 1, wherein the second one of the plurality of parameters (Y2) is equal to the key plus the second random number (M) multiplied by the common shared secret (S).

5. The sender apparatus of claim 1, wherein the common shared secret (S) is calculated using a hashing function performed on a Diffie-Hellman number plus the second random number (R), wherein the Diffie-Hellman number is equal to a dividend modulo a divisor, wherein the dividend is the recipient public number (PUBr) to the power of the first private prime number (Ps) and the divisor is the first prime number (P).

6. The sender apparatus of claim 1, wherein the recipient apparatus comprises:
a recipient processing element;
a recipient transceiver; and
recipient memory for storing data, the first prime number (P), the second prime number (G), the third prime number (C), the recipient private prime number (Pr), wherein the recipient private prime number (Pr), the first prime number (P), and the second prime number (G) are used by the recipient processing element to calculate the recipient public number (PUBr) according to an equation $PUB_r = G^{Pr} \bmod P$.

7. The sender apparatus of claim 6, wherein the recipient public number (PUBr) is equal to a dividend modulo a divisor, wherein the dividend is the second prime number (G) raised to the power of the recipient private prime number (Pr) and the divisor is the first prime number (P).

8. The sender apparatus of claim 1, wherein the second prime number (G) is the smallest quadratic residue mod the first prime number (P).

9. A method for communicating data between a sender device and a receiver device, comprising:
sharing simultaneous equations and a first prime number (P), a second prime number (G) and a third prime number (C) between the sender device and the receiver device via a trusted relationship;
generating a first random number (M), a second random number (R) and a randomly generated key (K) at the sender device;
calculating a plurality of parameters (Y1,Y2) using the first random number (M), the second random number (R), the first prime number (P), the second prime number (G), the third prime number (C), the randomly generated key (K), a calculated shared secret (S), and the simultaneous equations at the sender device, the simultaneous equations defining corresponding relationships between the first random number (M), the second random number (R) and the randomly generated key (K);
encrypting data using the key (K) at the sender device;
deleting the key (K) at the sender device after encryption of the data;
transmitting the encrypted data, the plurality of parameters (Y1, Y2) and the second random number (R) to the receiver device without transmitting the key (K);
generating the key (K) at the receiver device using the plurality of received parameters (Y1,Y2), the calculated shared secret (S), the first random number (M), the received second random number (R), the first prime number (P), the second prime number (G), the third prime number (C) and the simultaneous equations;
decrypting the encrypted data at the receiver device using the generated key (K); and
deleting the generated key (K) at the receiver device after decryption of the data.

10. The method of claim 9 further comprising: exchanging a sender public number (PUBs) and a recipient public number (PUBr) between the sender device and the receiver device, the sender public number (PUBs) calculated using the first prime number (P), the second prime number (G) and a sender private prime number (Ps) stored in the sender device and the recipient public number (PUBr) calculated using the first prime number (P), the second prime number (G) and a recipient private prime number (Pr) stored in the recipient device, the sender public number (PUBs) used at the recipient device to generate the calculated shared secret and the recipient public number (PUBr) used at the sender device to generate the calculated shared secret.

11. The method of claim 9, wherein the one or more equations are linear equations.

12. The method of claim 9, wherein the one or more prime numbers comprise Diffie-Hellman variables.

13. The method of claim 10, wherein the calculated shared secret (S) is generated at the sender device using a hashing function performed on a Diffie-Hellman number plus the second random number (R), wherein the Diffie-Hellman number is equal to a dividend modulo a divisor, wherein the dividend is the recipient public number (PUBr) to the power of the sender private prime number (Ps) and the divisor is the first prime number (P).

14. The method of claim 10, wherein the calculated shared secret (S) is generated at the receiver device using a hashing function performed on a Diffie-Hellman number plus the second random number (R), wherein the Diffie-Hellman number is equal to a dividend modulo a divisor, wherein the dividend is the sender public number (PUBs) to the power of the recipient private prime number (Pr) and the divisor is the first prime number (P).

* * * * *